(12) United States Patent
Baker

(10) Patent No.: US 6,351,697 B1
(45) Date of Patent: Feb. 26, 2002

(54) AUTONOMOUS-DISPATCH SYSTEM LINKED TO MINE DEVELOPMENT PLAN

(75) Inventor: Mark R. Baker, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 09/454,882

(22) Filed: Dec. 3, 1999

(51) Int. Cl.⁷ .............................. G01S 5/02; B60P 1/16; G06F 7/00
(52) U.S. Cl. ................... 701/50; 701/200; 342/357.07; 37/348
(58) Field of Search ................... 701/50, 207, 200, 701/117; 340/988, 993; 342/357.07, 457, 147, 357.17; 37/348, 414, 411, 413

(56) References Cited

U.S. PATENT DOCUMENTS

| | | | | |
|---|---|---|---|---|
| 3,972,420 A | * | 8/1976 | Stock et al. .................. 212/14 |
| 3,979,731 A | * | 9/1976 | Naplatanov et al. ..... 340/172.5 |
| 4,092,050 A | * | 5/1978 | Sobeck ......................... 298/18 |
| 4,465,155 A | * | 8/1984 | Collins ....................... 180/169 |
| 4,831,539 A | * | 5/1989 | Hagenbuch ................. 364/449 |
| 5,277,471 A | * | 1/1994 | Thibault ..................... 296/167 |
| 5,327,347 A | * | 7/1994 | Hagenbuch ............. 364/424.07 |
| 5,438,771 A | | 8/1995 | Sahm et al. ................... 37/348 |
| 5,751,245 A | * | 5/1998 | Janky et al. ................ 342/357 |
| 5,850,341 A | | 12/1998 | Fournier et al. ........ 364/424.07 |
| 6,038,509 A | * | 3/2000 | Poppen et al. .............. 701/210 |
| 6,114,993 A | * | 9/2000 | Henderson et al. .... 342/357.17 |

\* cited by examiner

*Primary Examiner*—Tan Nguyen
*Assistant Examiner*—Dalena Tran
(74) *Attorney, Agent, or Firm*—Antonio R. Durando; Durando Birdwell & Janke, PLC

(57) ABSTRACT

An autonomous dispatch system links positioning-system units mounted on mining and haulage equipment to a computerized mine development plan for ascertaining the origin of mined material and directing its disposition according to a predetermined downstream-processing plan. A destination signal is automatically communicated to the haulage vehicle, which is then autonomously guided to the correct destination and tracked until the load is released after arrival. If the haulage vehicle is manually operated, the destination signal and the vehicle's progress toward it are preferably also displayed on a monitor for the operator's information and use. The system may further include hardware for blocking the release of a load from the haulage vehicle until and unless the vehicle has reached the prescribed destination.

27 Claims, 4 Drawing Sheets

AUTONOMOUS-DISPATCH SYSTEM LINKED TO MINE DEVELOPMENT PLAN

BACKGROUND OF THE INVENTION

1. Field of the Invention

This invention is related in general to mining systems and, in particular, to a novel approach for dispatching mine trucks from the mining site to the appropriate destination according to a predetermined mine development plan.

2. Description of the Related Art

Surface mine development plans outline a proposed mining sequence according to the quality of the ore and mining conditions present in various parts of the mining property. As one skilled in the art would readily understand, drill-core samples are routinely taken from the mine property and assayed to assess the mineral content and rock characteristics of various regions within the mine boundary. Based on these data, three-dimensional maps of the mine are developed showing various properties of interest, such as the average mineral content, as a function of depth and location within the mine property. For example, referring to the drawings, wherein like parts are designated throughout with like numerals and symbols, FIG. 1 illustrates a horizontal mining-plan map for a given vertical elevation in the mine, wherein blocks A–F have been defined on the basis of substantially uniform ore concentration within each block (shown as 0.09, 0.05, 0.002, 0.10, 0.07, and 0.12, respectively). FIG. 2 illustrates the same kind of information along a vertical section of the mine. This information is used to determine an optimal sequence of extraction and downstream processing of the mined material based on market and operating conditions. For instance, current market conditions and operating costs may prevent the economic extraction of material below a predetermined depth in the mine pit. Thus, the mining plan would reflect the fact that no extraction should take place below that depth. Mine plans are updated on an ongoing basis as new data are generated while extraction progresses.

One of the most important economic variables in a surface mine operation is the routing of the mined material to the appropriate destination for further processing. Depending on the quality of the material, it may be appropriate to route it to a smelter, or a leach field, or a dump area, and the correct routing is obviously critical to the economic welfare of an operation. The mine development plan delineates three-dimensional blocks of material based on average properties of neighboring sections that have been assayed during development. The plan prescribes the destination of the material mined from each block so as to optimize the mine's operation and profitability. To that end, in practice the various blocks are staked out by visible markers separating one block from the other, so that the operator of an excavating machine has direct knowledge of the source of the mined material within the mining plan and can accordingly dispatch the driver of a haulage truck to the correct destination. For example, referring to FIG. 1, ore mined from block A could be dispatched to a smelter because of its high mineral content, while material from block C would be sent to the dump because current operating costs and market conditions would not justify its exploitation.

Thus, in essence, the operator of the excavation machine makes a determination about the intended destination of a particular load based on visually acquired information and so informs the driver of the corresponding haulage vehicle. Because of the human factor involved in this dispatching process, errors are easily made and difficult to recognize and correct. Surface markers, such as stakes and tapes laid out on the surface between mining blocks, can become dislodged by equipment, wind and dirt slides; in addition, machine operators can become distracted by more pressing demands requiring their attention. All of these factors contribute to a large number of unchecked misroutings of mined material. It has been estimated that about 30% of the material extracted in a surface mine has typically been misdirected to the wrong downstream processing location. For example, commercial-grade ore has been sent to the dump and poor material to a smelter. The resulting economic losses have been of great magnitude, often sufficient to affect the viability of a mine.

Since this problem has been recognized, efforts have been made to improve the performance of operators and significant gains have been claimed by the use of systems that aid the operators of excavating machines minimize such mistakes. For example, one such system, disclosed in U.S. Pat. No. 5,850,341, incorporates the mining plan in a computerized database, monitors the position of the mining bucket with a global positioning system (GPS) unit, determines the corresponding block being mined from the mining plan, and alerts the machine operator of the correct source of the mined material. Based on this information, the operator then instructs the driver of the corresponding haulage vehicle about the intended destination of its load.

In spite of the improvement provided by this system, a serious problem remains because of the human factor involved in the steps of acquiring information from the system, using it to instruct the driver of a haulage truck, and implementing the instruction to deliver the load to the correct destination. Therefore, there is still a need for a foolproof system that is not as dependent on human factors as those implemented in the prior art. The present invention provides a procedure and an apparatus for overcoming the deficiencies of prior-art practices.

BRIEF SUMMARY OF THE INVENTION

The primary objective of this invention is a secure system for dispatching mined material to the appropriate destination according to a predetermined mine development plan.

Another objective is an approach that minimizes the occurrence of errors by reducing human participation in the implementation of the dispatching system.

Still another objective is a dispatching system that also provides information for updating the current reserves left unmined in various regions of the mine, thereby providing an ongoing inventory of all production streams associated with the mining plan.

Another goal is a system that is suitable for implementation within an automated haulage and mining system.

Yet another object is a system that can be implemented using hardware developed for the automated operation of a surface mine.

A final objective is a system that can be implemented easily and economically according to the above stated criteria.

Therefore, according to these and other objectives, the preferred embodiment of the present invention consists of linking positioning-system units mounted on mining and haulage equipment to a computerized mine development plan for ascertaining the origin of mined material and directing its disposition according to a predetermined downstream-processing plan. A destination signal is automatically communicated to the haulage vehicle, which is then autonomously guided to the correct destination and tracked until the load is released after arrival. If the haulage vehicle is manually operated, the destination signal and the vehicle's progress toward it are preferably also displayed on a monitor for the operator's information and use. The system may further include hardware for blocking the release of a load from the haulage vehicle until and unless the vehicle has reached the prescribed destination.

According to another aspect to the invention, the weight of each load mined and transported to a given target destination is measured by weight sensors in the haulage vehicles (or estimated based on the size of the equipment) and accounted for to update the ore reserves remaining in the various blocks of the mining plan. The same information can advantageously be used to keep track of inventories and production data for downstream operations.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 2:
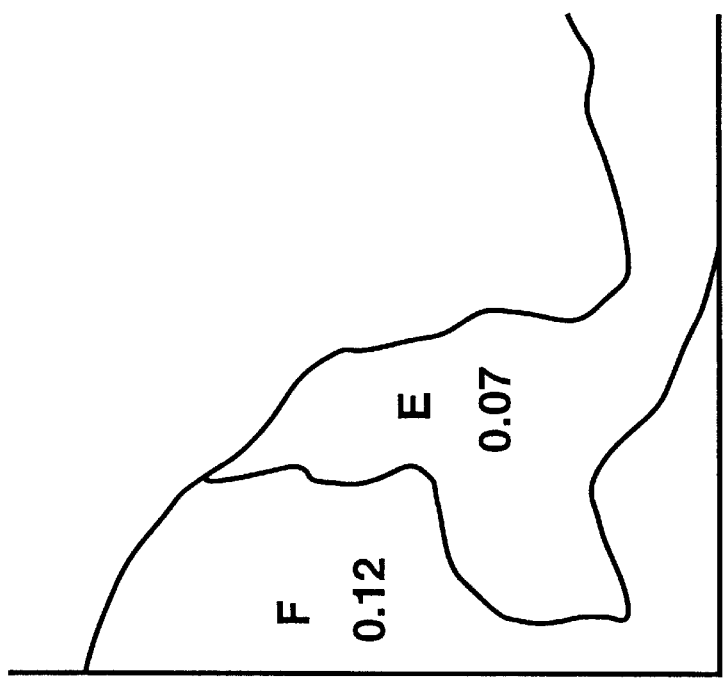
FIG. 2 is an illustration of a prior-art mine map showing blocks of ore of substantially constant grade in a vertical plane across the mine.
Figure 1:
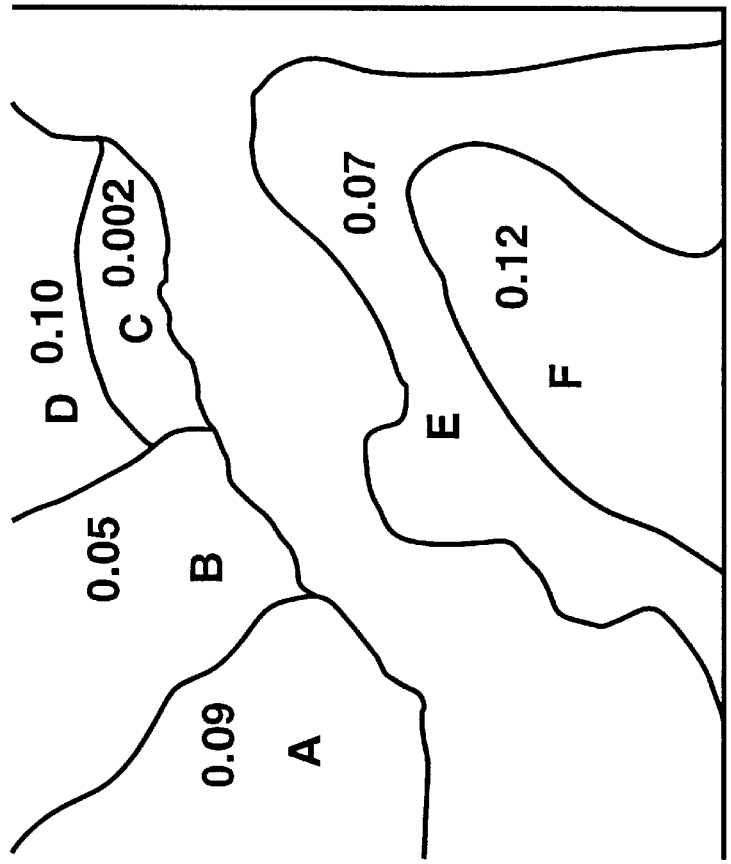
FIG. 1 is an illustration of a prior-art mine map showing blocks of ore of substantially constant grade in a horizontal plane at a predetermined vertical elevation in the mine.

For the purposes of this disclosure, it is understood that every reference to an operator is intended to apply as well to an onboard automated control system. Surface mines utilize a variety of work machines for excavating and transporting ore, grading and stabilizing roadways and slopes in the mine pit, and providing all support functions necessary to the operation of a mine. Most work machines, such as excavators, shovels, backhoes and the like, are human-operated, mobile pieces of equipment constantly being moved around the surface of the mine. Skilled operators ensure that each mining machine is positioned in the right place and optimally oriented to perform its intended function. For example, an excavator operator will ensure that the undercarriage of the machine is sufficiently close to the minable seam and that its boom is oriented so as to permit the bucket of the machine to reach and extract a full load of ore.

In order to improve safety and efficiency, much effort is currently under way to develop automated systems for controlling the operation of work machines in surface-mine and other environments. Thus, the ability to determine the exact position of critical components of a working machine, such as the bucket of an excavator, is a very important feature of any such effort to automate certain aspects of a mining operation. Accordingly, various positioning systems have been developed in this and related arts based on the properties of various triangulation tools such as lasers, radio, microwave, radar, and the Global Position System (GPS).

For example, in U.S. Pat. No. 5,438,771, Sahm et al. describe a system for determining the location and orientation of a work machine having a fixed undercarriage supporting a car body rotatably connected to it. The system utilizes a GPS unit placed on the car body at a place removed from its axis of rotation. By collecting at least three coordinate positions of the GPS antenna as the car body rotates over its stationary undercarriage, the plane corresponding to the orientation of the machine and the position of the axis of rotation can be calculated. Based on these data, the current position of the GPS antenna, and the geometry of the machine, the position and orientation of every critical component of the machine, including its bucket, can be determined and used for controlling its operation.

Similarly, commonly owned copending U.S. Ser. No. 09/323,190, describes a positioning system wherein two GPS units are mounted at two separate points on the body of a work machine to periodically measure their three-dimensional coordinates with respect to a chosen reference system. As soon as two sets of measurements are recorded, a plane is fitted through the four points so collected and it is then used to determined the current orientation of the machine. As each additional set of position data is collected at predetermined intervals for the two points on the machine, a new plane equation is calculated to update the orientation of the machine based on a predetermined number of prior measurements. Based on the current coordinates of the two GPS antennae, the current orientation plane so calculated, and the known geometry of the work machine, the current position of its critical components can be determined as well irrespective of the specific motion pattern of the machine.

Figure 3:
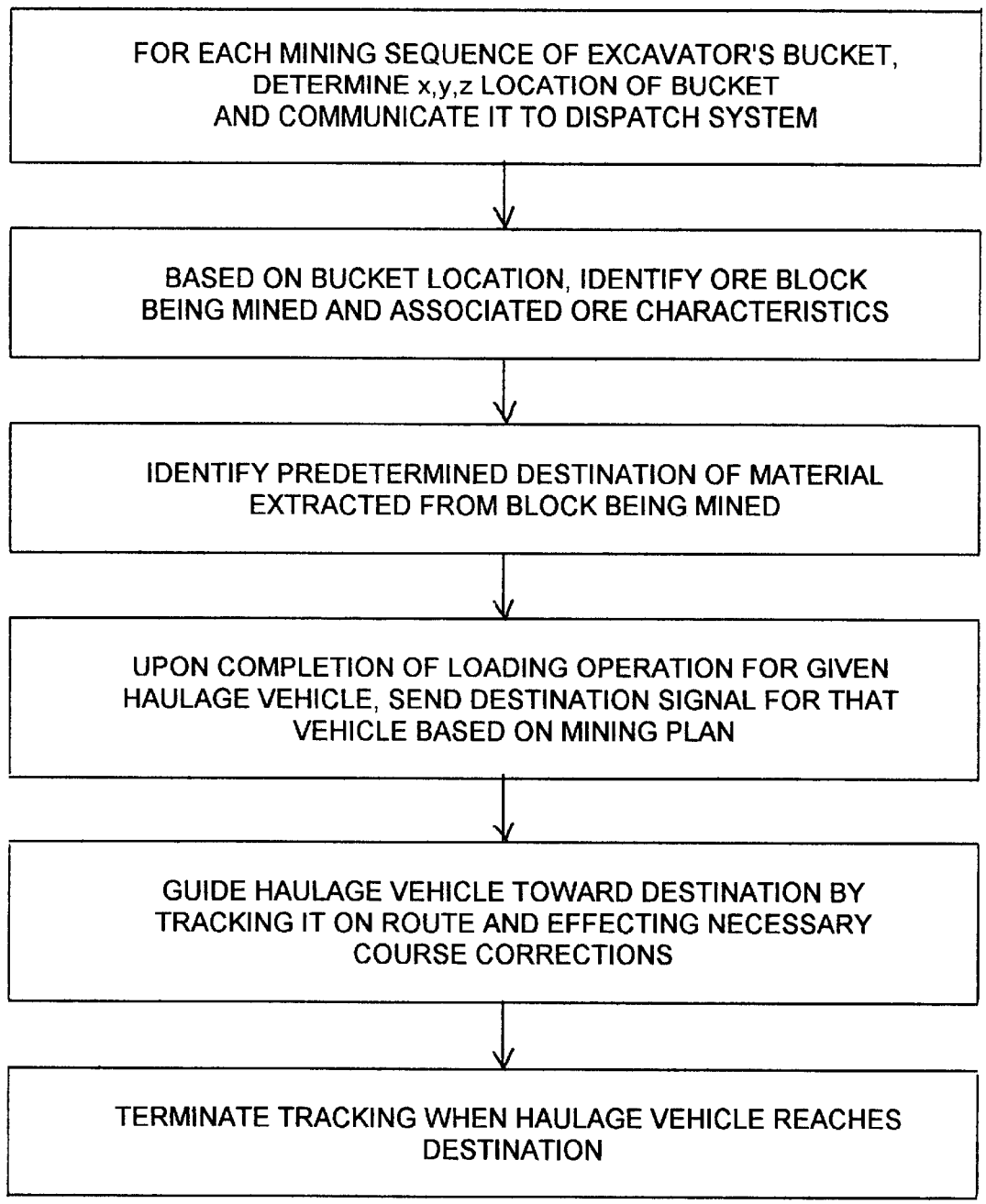
FIG. 3 is a schematic representation of the steps involved in implementing the automated-dispatch system of the invention.

Thus, the means for tracking the position of the excavator's bucket of a mining machine on a current, substantially real-time, basis are available in the art. According to this invention, as outlined in the block diagram of FIG. 3, the x, y, z position of the bucket is relayed to a dispatch system that includes a computer database representing a current, digital three-dimensional mine map and an associated mine development plan. That is, for each block of ore considered to have sufficiently uniform characteristics to warrant equal treatment, a mining-sequence schedule and a destination for downstream processing that have previously been determined are stored in the database constituting the mine development plan. Based on the current working location of the bucket of an excavator within the mine map, the exact block being mined and the corresponding characteristics of the mined material can be precisely identified from the map. Moreover, the destination of the mined material for downstream processing is also determined from the mine development plan associated with the map. Accordingly, a signal communicating the destination prescribed by the mining plan for that particular load is automatically transmitted to the haulage vehicle by the dispatch system, preferably via a wireless communication system such as RF, spread spectrum, microwave or similar means. In a completely automated mine, the vehicle is then guided to reach that destination by remotely directing the vehicle's onboard guidance system. The vehicle is directed by remote control to follow a predetermined route to the prescribed destination; its positioning system is periodically sampled to ensure that the vehicle tracks that route; and appropriate course corrections are made if sufficiently large deviations are identified. In a mine where haulage vehicles are operated manually, the driver is instructed to reach the destination by means of some easily recognizable signal, such as a visual item appearing on a monitor within the driver's view. A tracking feature may also be implemented to monitor the vehicle's progress toward its intended destination and alert the driver of detected deviations.

Obviously, the invention requires that haulage vehicles be equipped at least with apparatus for receiving the destination signal. Since it is envisioned that the dispatch system of the invention will be a component of a completely automated mine, this requirement is not expected to add to the cost of its implementation. Similarly, each mine vehicle is also expected to include a GPS unit and an onboard processor for controlling and keeping track of its current location within the mine. Therefore, another aspect of the invention resides in the idea of further ensuring delivery of the mined load to the correct destination by automatically tracking its progress toward it. Accordingly, whether the haulage vehicle is autonomously or manually operated, its positioning system relays its ongoing position to the dispatch system as the vehicle proceeds toward the prescribed destination. If the vehicle is equipped with a monitor, the route to destination can be displayed together with the current path being followed by the vehicle. If the two do not coincide within a predetermined certainty parameter, the dispatch system alerts the driver and redirects his/her attention toward the correct destination. In an autonomous mine, the vehicle would automatically be guided to the correct destination.

Figure 4:
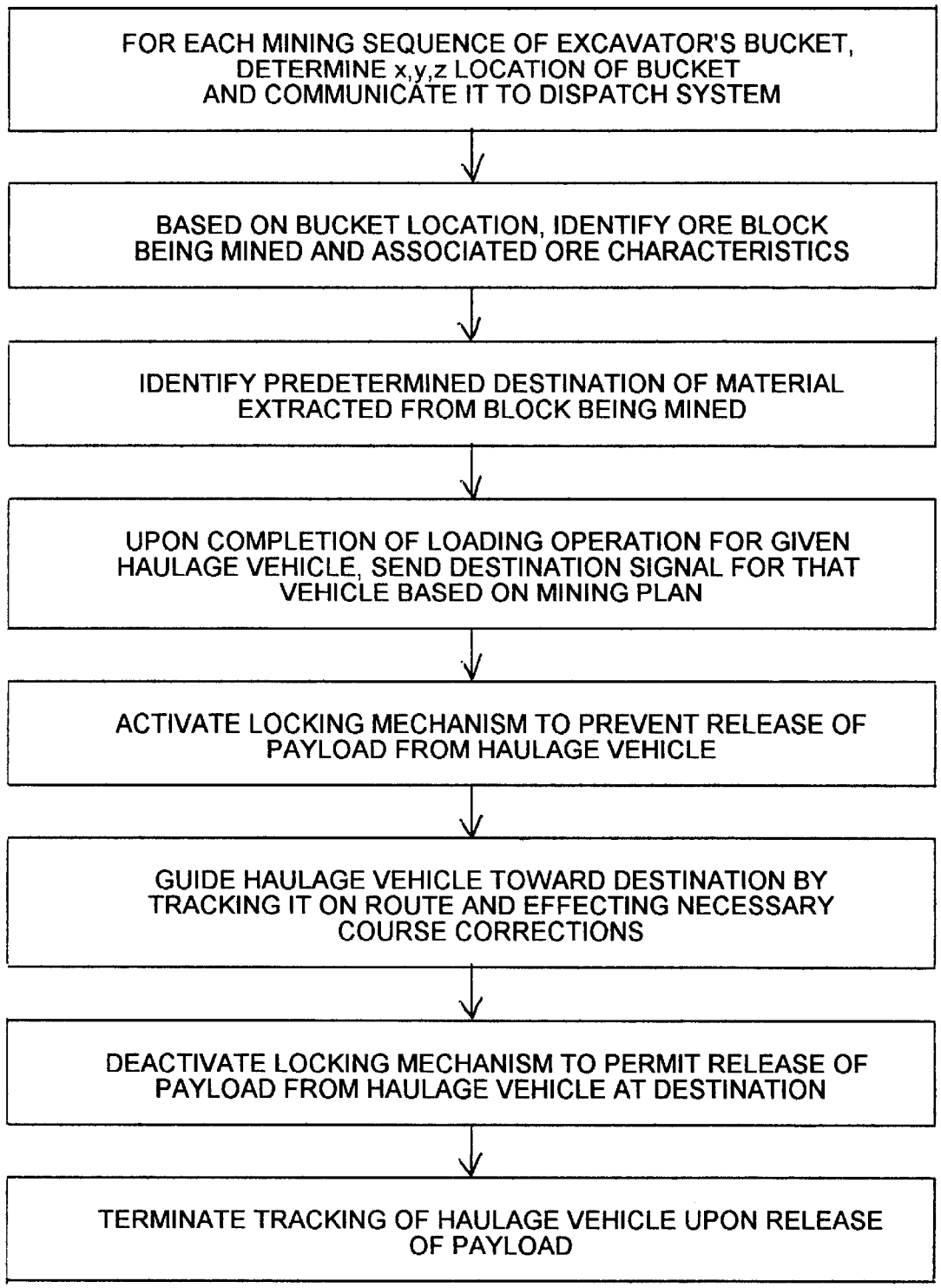
FIG. 4 is a schematic representation of the system illustrated in FIG. 3, further including the step of activating a locking mechanism in the haulage vehicle to control the discharge of its payload.

In order to further ensure that a particular load is delivered to the appropriate downstream processing location and not elsewhere, each haulage vehicle is preferably equipped with a locking mechanism controlled by the dispatch system such that a load can only be released at the prescribed destination. Such a lock mechanism would preferably be activated and deactivated automatically, respectively, by signals received from the dispatch system upon transmission of the original destination signal and upon receipt of vehicle position information showing that the load has reached the intended destination. Such a system would eliminate human interaction and, therefore, minimize the opportunity for error. This procedure is illustrated in the flow diagram of FIG. 4.

Figure 5:
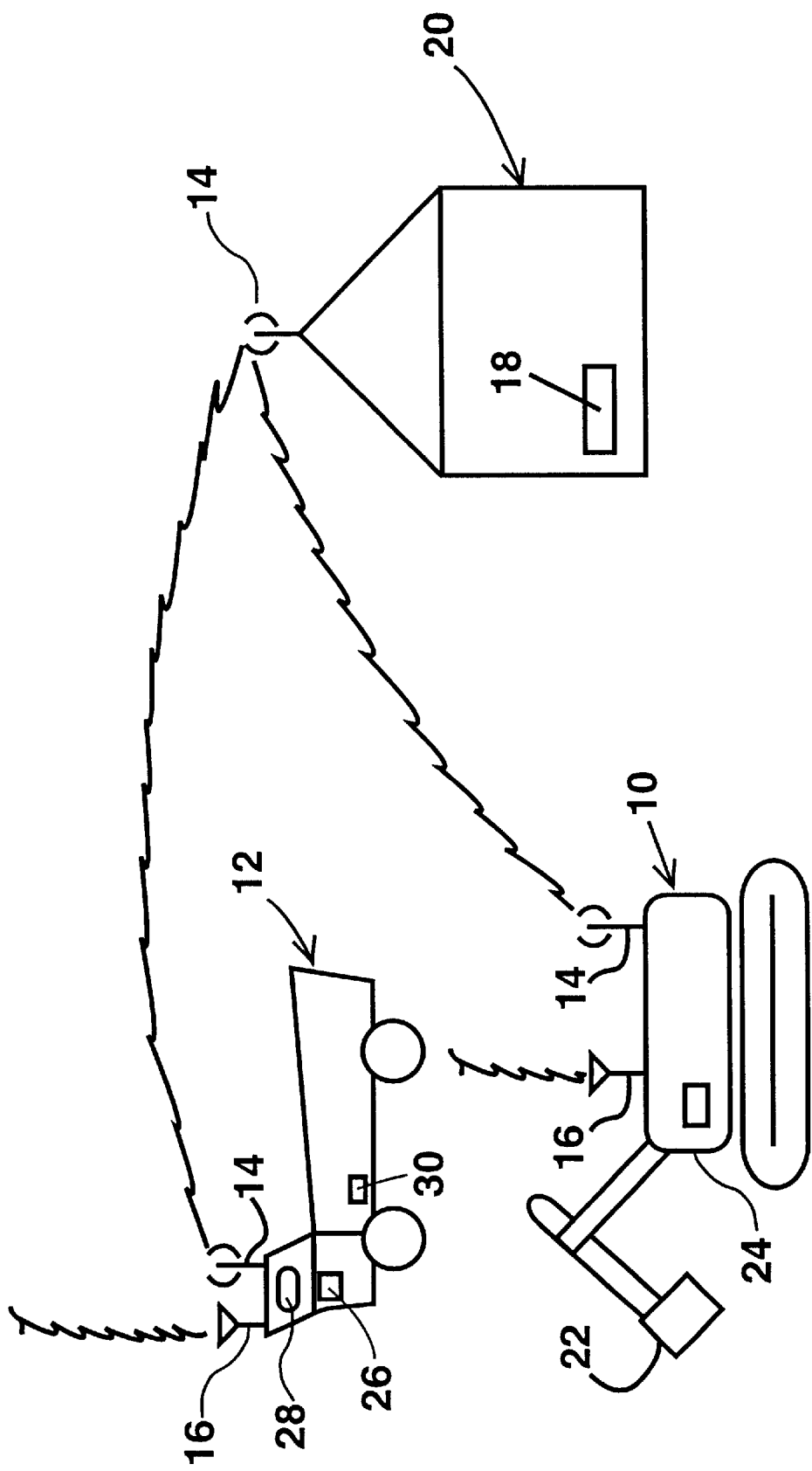
FIG. 5 is a schematic diagram illustrating the hardware required to implement the automated dispatch system of the invention.

FIG. 5 is a schematic illustration of the apparatus required to implement the dispatch system of the invention. Each excavator 10 and haulage vehicle 12 within the system is equipped with two-way communication apparatus 14 and with a positioning system unit 16 (such as a GPS unit). In the preferred embodiment, the mine maps and development plan are stored in digital form in a computer 18 housed in a base station 20 which is also equipped with two-way communication apparatus 14. Thus, the precise location of the bucket 22 of the excavator 10 can be determined periodically, using its positioning system unit and an onboard processor 24, and communicated to the computer 18 at the base station together with identifying information regarding the particular vehicle 12 being loaded. Upon processing this information, the computer 18 identifies the predetermined destination corresponding to the work site of the bucket 22 and communicates it to the haulage vehicle 12 in the form of a destination signal fed to a processor 26 onboard the vehicle 12. In a manually operated vehicle, the processor 26 provides a humanly discernible indication of the intended destination, such as a visual display on a monitor 28 or equivalent device, so that the operator is instructed automatically by the mine dispatch system. In a completely automated vehicle, the processor 26 guides the vehicle to the intended destination using appropriate hardware and guidance software incorporated within the vehicle. As explained above, the vehicle 12 may also be equipped with a locking mechanism 30 controlled by the dispatch system to ensure that a load can only be released at the prescribed destination.

It is noted that the control mechanisms and related processing hardware and software required to implement the various steps of the invention are well known in the art. Every step of the invention by itself has already been implemented in the prior art for a variety of objectives. For example, U.S. Pat. No. 5,850,341 describes a particular way of determining the position of the excavating implement, communicating it to a processor, correlating it to a mine plan stored in the processor's memory to identify the source of the mined material, and communicating with the operator of the excavating machine to perform a variety of functions, including that of directing the driver of the vehicle carrying the loaded material to the appropriate processing facility. The novel idea of the present invention is the notion of having the dispatch system communicate directly and automatically to the haulage vehicle the intended destination of the mined material in order to eliminate human participation from the sequence of acts and prevent otherwise unavoidable routing errors. In order to implement this concept in a manner consistent with the apparatus and functions already present in an autonomous mine, the invention further provides automated means for tracking the vehicle to destination and for preventing release of its cargo before it arrives there.

Implementation of this invention is expected to virtually eliminate misrouting of mined material to erroneous destinations. Accordingly, it is believed that it will have significant economic impact on the viability of a mining operation.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

I claim:

1. In a surface mine where an excavator is mining material from an ore reserve at a mining site and a haulage vehicle is transporting the material away from the mining site, a method for autonomously dispatching the haulage vehicle to one of several alternative locations according to a variable characteristic of the ore being mined, the method comprising the following steps:

(a) providing a computerized map of the ore reserve at a processing site, said map being subdivided into blocks, wherein each block corresponds to a section of the mine where said variable characteristic is substantially uniform;

(b) establishing position coordinates of the mining site where the excavator is mining a particular load of material;

(c) identifying a block in the computerized map corresponding to said position coordinates;

(d) assigning a destination to said particular load of material, said destination being associated with the block in the computerized map corresponding to said position coordinates;

(e) communicating the destination to said haulage vehicle directly from said processing site;

(f) providing autonomous confirmation of arrival of the haulage vehicle at said destination; and (g) releasing said load only after the haulage vehicle reaches said destination.

2. The method of claim 1, wherein said step (f) is carried out by determining a current position of the haulage vehicle with reference to a predetermined route to said destination, and by providing a signal when the haulage vehicle arrives at the destination.

3. The method of claim 2, wherein said step of determining a current position of the haulage vehicle with reference to a predetermined route to said destination is carried out by measuring current position coordinates of the haulage vehicle using a global-positioning-system unit, and by comparing said current position coordinates to said predetermined route in a processing unit.

4. The method of claim 3, wherein said signal is an audible signal in the haulage vehicle.

5. The method of claim 2, wherein said signal is an audible signal in the haulage vehicle.

6. The method of claim 1, wherein said step (f) is carried out by determining and displaying a current position of the haulage vehicle with reference to a predetermined route to said destination, and by providing a signal when the haulage vehicle arrives at the destination.

7. The method of claim 6, wherein said step of determining a current position of the haulage vehicle with reference to a predetermined route to said destination is carried out by measuring current position coordinates of the haulage vehicle using a global-positioning-system unit, and by comparing said current position coordinates to said predetermined route in a processing unit.

8. The method of claim 7, wherein said step of displaying a current position of the haulage vehicle with reference to a predetermined route to said destination is carried out on a monitor.

9. The method of claim 8, wherein said signal is an audible signal in the haulage vehicle.

10. The method of claim 7, wherein said signal is an audible signal in the haulage vehicle.

11. The method of claim 6, wherein said step of displaying a current position of the haulage vehicle with reference to a predetermined route to said destination is carried out on a monitor.

12. The method of claim 11, wherein said signal is an audible signal in the haulage vehicle.

13. The method of claim 6, wherein said signal is an audible signal in the haulage vehicle.

14. The method of claim 1, wherein said releasing step is carried out using a remotely-controlled lock releasable in response to a signal indicating that the haulage vehicle has reached said destination.

15. The method of claim 1, further including the step of determining and tracking a current position of the haulage vehicle with reference to a predetermined route to the destination.

16. The method of claim 15, wherein said step of determining a current position of the haulage vehicle with reference to a predetermined route to said destination is carried out by measuring current position coordinates of the haulage vehicle using a global-positioning-system unit, and by comparing said current position coordinates to said predetermined route in a processing unit.

17. The method of claim 15, further including the step of displaying said current position of the haulage vehicle with reference to a predetermined route to said destination.

18. In a surface mine where an excavator is mining material from an ore reserve at a mining site and a haulage vehicle is transporting the material away from the mining site, apparatus for autonomously dispatching the haulage vehicle to one of several alternative locations according to a variable characteristic of the ore being mined, the apparatus comprising:

(a) a computerized map of the ore reserve at a processing site, said map being subdivided into blocks, wherein each block corresponds to a section of the mine where said variable characteristic is substantially uniform;

(b) means for establishing position coordinates of the mining site where the excavator is mining a particular load of material;

(c) means for identifying a block in the computerized map corresponding to said position coordinates;

(d) means for assigning a destination to said particular load of material, said destination being associated with the block in the computerized map corresponding to said position coordinates;

(e) means for communicating the destination to said haulage vehicle directly from said processing site; and (f) means for providing autonomous confirmation of arrival of the haulage vehicle at said destination.

19. The apparatus of claim 18, wherein said means for providing autonomous confirmation of arrival of the haulage vehicle at said destination includes means for determining a current position of the haulage vehicle with reference to a predetermined route to said destination, and means for providing a signal when the haulage vehicle arrives at the destination.

20. The apparatus of claim 19, wherein said means for determining a current position of the haulage vehicle with reference to a predetermined route to said destination includes a global-positioning-system unit and a processing unit.

21. The apparatus of claim 18, wherein said means for providing autonomous confirmation of arrival of the haulage vehicle at said destination includes means for determining and displaying a current position of the haulage vehicle with reference to a predetermined route to said destination, and means for providing a signal when the haulage vehicle arrives at said predetermined route.

22. The apparatus of claim 21, wherein said means for determining a current position of the haulage vehicle with reference to a predetermined route to said destination includes a global-positioning-system unit and a processing unit.

23. The apparatus of claim 21, wherein said means for displaying a current position of the haulage vehicle with reference to a predetermined route to said destination includes a monitor.

24. The apparatus of claim 23, further including means for determining and tracking a current position of the haulage vehicle with reference to a predetermined route to the destination.

25. The apparatus of claim 24, wherein said means for determining and tracking a current position of the haulage vehicle with reference to a predetermined route to said destination includes a global-positioning-system unit and a processing unit.

26. The apparatus of claim 24, further including means for displaying said current position of the haulage vehicle with reference to a predetermined route to said destination.

27. The apparatus of claim 18, wherein said means for releasing the load only after the haulage vehicle reaches said destination includes a remotely-controlled lock releasable in response to a signal indicating that the haulage vehicle has reached the destination.

* * * * *